United States Patent
Van Dijk

(10) Patent No.: US 8,669,674 B2
(45) Date of Patent: Mar. 11, 2014

(54) POWER SUPPLY CIRCUIT WITH SHARED FUNCTIONALITY AND METHOD FOR OPERATING THE POWER SUPPLY CIRCUIT

(75) Inventor: Luc Van Dijk, Kranenburg (DE)

(73) Assignee: NXP B.V., Eindhoven (NL)

(*) Notice: Subject to any disclaimer, the term of this patent is extended or adjusted under 35 U.S.C. 154(b) by 512 days.

(21) Appl. No.: 12/972,413

(22) Filed: Dec. 17, 2010

(65) Prior Publication Data

US 2012/0153723 A1 Jun. 21, 2012

(51) Int. Cl.
*H02J 3/14* (2006.01)

(52) U.S. Cl.
USPC .......................................................... 307/31

(58) Field of Classification Search
USPC .......................................................... 307/31
See application file for complete search history.

(56) References Cited

U.S. PATENT DOCUMENTS

| | | | |
|---|---|---|---|
| 8,089,253 B2 * | 1/2012 | Murtojarvi | 323/224 |
| 2003/0006650 A1 * | 1/2003 | Tang et al. | 307/43 |
| 2010/0174195 A1 * | 7/2010 | Haider et al. | 600/459 |
| 2011/0115301 A1 * | 5/2011 | Bhavaraju et al. | 307/86 |
| 2011/0241431 A1 | 10/2011 | Chen et al. | |

FOREIGN PATENT DOCUMENTS

| | | | |
|---|---|---|---|
| CN | 101800498 A1 | | 6/2011 |
| JP | 05-146098 | * | 6/1993 |

* cited by examiner

*Primary Examiner* — Jared Fureman
*Assistant Examiner* — Duc M Pham

(57) ABSTRACT

A power supply circuit and a method for operating the power supply circuit are described. In one embodiment, a power supply circuit includes at least one input terminal to receive at least one input voltage, a power element including multiple power element components configured to convert the at least one input voltage to at least one output voltage, multiple regulator controllers configured to control the power element components for the conversion of the at least one input voltage to the at least one output voltage, at least one first switch coupled to the regulator controllers and the power element components, and multiple output terminals to output the at least one output voltage. The at least one first switch is used to configure the power supply circuit to function as either one voltage regulator or multiple independent voltage regulators. Other embodiments are also described.

20 Claims, 3 Drawing Sheets

POWER SUPPLY CIRCUIT WITH SHARED FUNCTIONALITY AND METHOD FOR OPERATING THE POWER SUPPLY CIRCUIT

Embodiments of the invention relate generally to electrical systems and methods for operating the electrical systems and, more particularly, to power supply circuits and methods for operating the power supply circuits.

A power supply circuit converts an input voltage to a desired output voltage. A conventional power supply circuit usually implements multiple voltage regulators that are independent from each other. Each of the voltage regulators includes a power element and a regulator controller. However, because of thermal limitations, the conventional power supply circuit may have unnecessary circuit area overhead. The unnecessary circuit area overhead can cause undesired additional costs to the power supply circuit.

A power supply circuit and a method for operating the power supply circuit are described. In one embodiment, a power supply circuit includes at least one input terminal to receive at least one input voltage, a power element including multiple power element components configured to convert the at least one input voltage to at least one output voltage, multiple regulator controllers configured to control the power element components for the conversion of the at least one input voltage to the at least one output voltage, at least one first switch coupled to the regulator controllers and the power element components, and multiple output terminals to output the at least one output voltage. The at least one first switch is used to configure the power supply circuit to function as either one voltage regulator or multiple independent voltage regulators. Other embodiments are also described.

In an embodiment, a power supply circuit includes at least one input terminal to receive at least one input voltage, a power element including multiple power element components configured to convert the at least one input voltage to at least one output voltage, multiple regulator controllers configured to control the power element components for the conversion of the at least one input voltage to the at least one output voltage, at least one first switch coupled to the regulator controllers and the power element components, and multiple output terminals to output the at least one output voltage. Each of the regulator controllers is coupled to a different one of the power element components. The at least one first switch is used to configure the power supply circuit to function as either one voltage regulator or multiple independent voltage regulators.

In an embodiment, a power supply circuit includes an input terminal to receive an input voltage, a power element including a first transistor and a second transistor, a first operational amplifier (OPAMP) and a second OPAMP, a first switch coupled to the first and second OPAMPs and the first and second transistors and two output terminals to output the at least one output voltage. The first and second transistors are configured to convert the input voltage to at least one output voltage. The first OPAMP is coupled to the first transistor, the second OPAMP is coupled to the second transistor, and the first and second OPAMPs are configured to control the first and second transistors for the conversion of the input voltage to the at least one output voltage. The first switch is used to configure the power supply circuit to function as either one voltage regulator or two independent voltage regulators.

In an embodiment, a method for operating a power supply circuit involves setting at least one first switch of the power supply circuit to selectively connect power element components of the power supply circuit to configure the power supply circuit to function as either one voltage regulator or multiple independent voltage regulators, receiving at least one input voltage at the power supply circuit, converting the at least one input voltage to at least one output voltage using the power element components, and outputting the at least one output voltage through output terminals of the power supply circuit.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
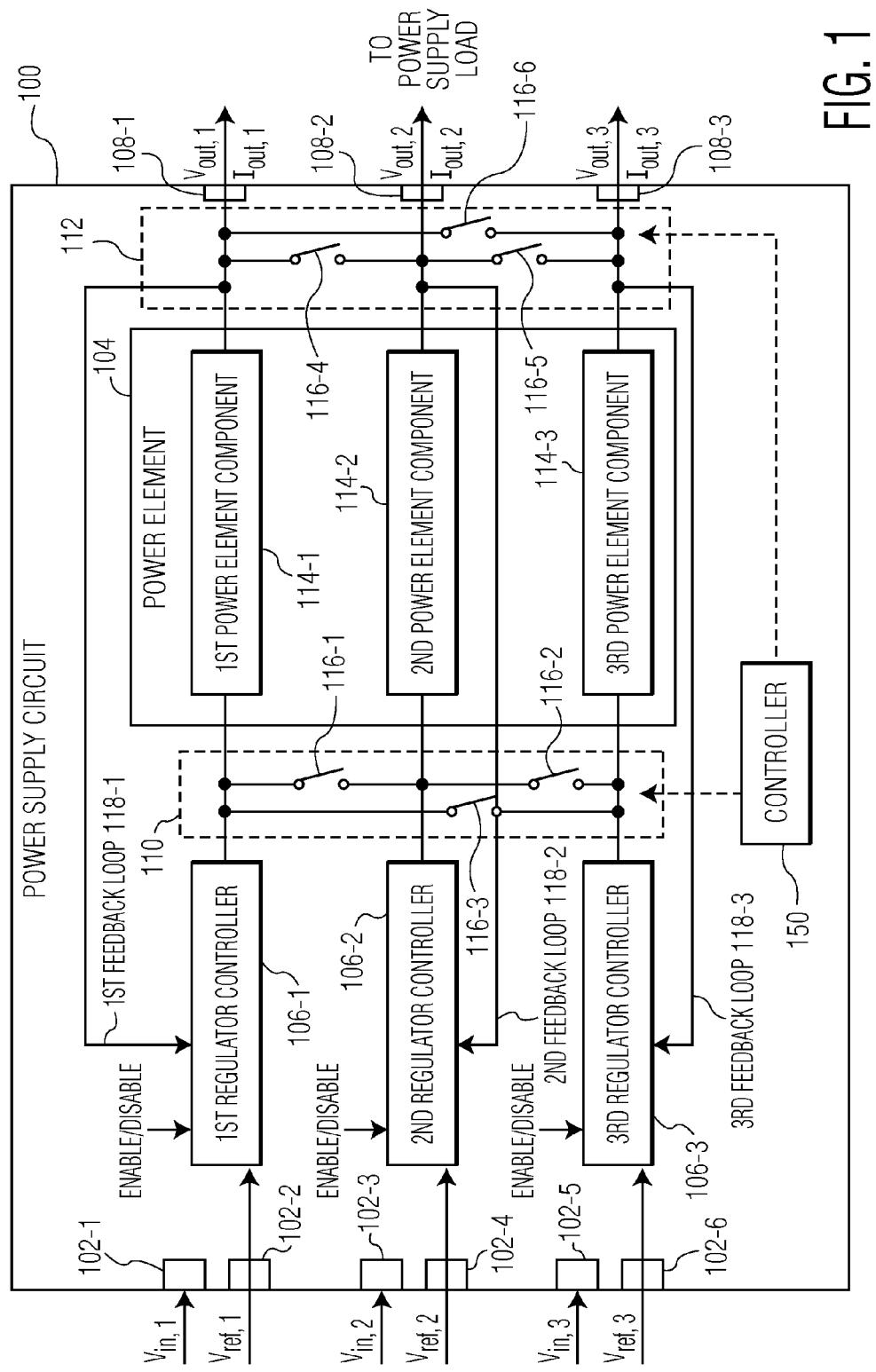
FIG. 1 is a schematic block diagram of a power supply circuit in accordance with an embodiment of the invention.

FIG. 1 is a schematic block diagram of a power supply circuit 100 in accordance with an embodiment of the invention. The power supply circuit may be used for various devices and applications, such as computers, industrial machineries, and household appliances. In some embodiments, the power supply circuit is used for an automotive application. For example, the power supply circuit is used for body controllers, rain wipers, passenger occupant detection systems, steering angle systems, rain light sensors and distance control systems of motor vehicles. In an embodiment, at least some components of the power supply circuit are implemented in a single integrated circuit (IC) chip.

In the embodiment depicted in FIG. 1, the power supply circuit 100 includes first, second, third, fourth, fifth and six input terminals 102-1, 102-2, 102-3, 102-4, 102-5, 102-6, a power element 104, first, second and third regulator controllers 106-1, 106-2, 106-3, first, second and third output terminals 108-1, 108-2, 108-3, a first set of switches 110, a second set of switches 112 and first, second, and feedback loops 118-1, 118-2, 118-3. Although the power supply circuit is depicted and described with certain components and functionality, other embodiments of the power supply circuit may include fewer or more components to implement less or more functionality. For example, the power supply circuit may have more or fewer than six input terminals, more or fewer than three regulator controllers, more or fewer than three output terminals, a single first switch, and/or a single second switch.

The input terminal 102-1 of the power supply circuit 100 is used to receive a first input voltage $V_{in,1}$. The input terminal 102-3 is used to receive a second input voltage $V_{in,2}$. The input terminal 102-5 is used to receive a third input voltage $V_{in,3}$. For example, the power supply circuit may receive three input signals and each of the three input signals has a voltage level. These input voltages may be identical or different from each other. The input terminal 102-2 is used to receive a first reference voltage $V_{ref,1}$. The input terminal 102-4 is used to receive a second reference voltage $V_{ref,2}$. The input terminal 102-6 is used to receive a third reference voltage $V_{ref,3}$. These reference voltages may be identical or different from each other. Although the power supply circuit is shown in FIG. 1 as receiving three input voltages $V_{in,1}$, $V_{in,2}$, $V_{in,3}$, the power supply circuit may be configured to receive more or fewer than three input voltages in other embodiments. In addition, although the power supply circuit shown is FIG. 1 as receiving three reference voltages $V_{ref,1}$, $V_{ref,2}$, $V_{ref,3}$, the power supply circuit may be configured to receive more or fewer than three reference voltages. The number of input terminals included in the power supply circuit may be dependent on the number of input voltages and/or reference voltage the power supply circuit is configured to receive.

The power supply circuit 100 may include more or fewer than six input terminals for receiving the input voltages $V_{in,1}$, $V_{in,2}$, $V_{in,3}$ and the reference voltages $V_{ref,1}$, $V_{ref,2}$, $V_{ref,3}$. For example, the power supply circuit may include fewer than three input terminals for receiving the first, second and third input voltages. In an embodiment, at least two of the three input voltages are identical. In this embodiment, the power supply circuit only needs one or two input terminals for receiving the first, second and third reference voltages. In another example, the power supply circuit may include fewer than three input terminals for receiving the first, second and third reference voltages. In an embodiment, at least two of the three reference voltages are identical. In this embodiment, the power supply circuit only needs one or two input terminals for receiving the first, second and third reference voltages. In another embodiment, at least one of the first, second and third reference voltages is provided internally within the power supply circuit. In this embodiment, the power supply circuit may need fewer than three input terminals for receiving the first, second and third reference voltages.

The power element 104 of the power supply circuit 100 converts at least one of the input voltages $V_{in,1}$, $V_{in,2}$, $V_{in,3}$ to at least one of first, second and third output voltages $V_{out,1}$, $V_{out,2}$, $V_{out,3}$. The output voltages may be identical or different from each other. In the embodiment depicted in FIG. 1, the power element performs voltage down-conversion. The power element may perform voltage up-conversion in other embodiments. As shown in FIG. 1, the power element includes a first power element component 114-1, a second power element component 114-2 and a third power element component 114-3. In an embodiment, each power element component is a transistor, such as an NMOS or PMOS transistor or an NPN or PNP bipolar junction transistor.

The first, second and third regulator controllers 106-1, 106-2, 106-3 of the power supply circuit 100 are configured to control the first, second and third power element components 114-1, 114-2, 114-3 for the conversion of at least one of the input voltages $V_{in,1}$, $V_{in,2}$, $V_{in,3}$ to at least one of the output voltages $V_{out,1}$, $V_{out,2}$, $V_{out,3}$. Each of the regulator controllers is coupled to a different one of the power element components. Each of the regulator controllers is further configured to be enabled (activated) or disabled (deactivated) by control signals "enable/disable." The regulator controllers may share the same reference input voltage or have different reference voltages.

The first output terminal 108-1 of the power supply circuit 100, which is connected to the first power element component 114-1, is used to output the output voltage $V_{out,1}$. The second output terminal 108-2, which is connected to the second power element component 114-2, is used to output the output voltage $V_{out,2}$. The third output terminal 108-3, which is connected to the third power element component 114-3, is used to output the output voltage $V_{out,3}$. For example, the power supply circuit may output three output signals to at least one load of the power supply circuit, such as at least one component of a motor vehicle. Each of the three output signals has a voltage level. In addition to the voltage levels, each of the three output signals may have a current level $I_{out,1}$, $I_{out,2}$, $I_{out,3}$.

The first, second, and feedback loops 118-1, 118-2, 118-3 connects the first, second and third output terminals 108-1, 108-2, 108-3 to the first, second and third regulator controllers 106-1, 106-2, 106-3, respectively. The feedback loops are used to regulate the output voltages $V_{out,1}$, $V_{out,2}$, $V_{out,3}$ to desired output voltages.

The first set of switches 110 of the power supply circuit 100 is coupled to the regulator controllers 106-1, 106-2, 106-3 and the power element components 114-1, 114-2, 114-3. The first set of switches is used to configure the power supply circuit to function as either one voltage regulator or multiple independent voltage regulators. In the embodiment depicted in FIG. 1, the first set of switches includes a first switch 116-1, a second switch 116-2 and a third switch 116-3. The first, second and third switches are typically implemented in transistors. Each of the first, second and third switches connects two of the regulator controllers and two corresponding power element components together. In other words, each of the first, second and third switches connects one regulator controller and a corresponding power element component to another regulator controller and a corresponding power element component. In another embodiment, the power supply circuit may only include one first switch that connects two regulator controllers and two corresponding power element components together.

The second set of switches 112 of the power supply circuit 100 are coupled to the power element components 114-1, 114-2, 114-3 and the output terminals 108-1, 108-2, 108-3. The second set of switches is used with the first set of switches 110 to configure the power supply circuit to function as either one voltage regulator or multiple independent voltage regulators. In the embodiment depicted in FIG. 1, the second set of switches includes a fourth switch 116-4, a fifth switch 116-5 and a sixth switch 116-6. Each of the fourth, fifth and sixth switches connects one of the output terminals to another one of the output terminals. In another embodiment, the power supply circuit may only include one second switch that connects two output terminals together.

By switching on or off the first, second and third switches 116-1, 116-2, 116-3, the first, second and third power element components 114-1, 114-2, 114-3 can be connected together or disconnected from each other. In addition, the fourth, fifth and sixth switches 116-4, 116-5, 116-6 can be switched on or off in a similar or same fashion as the first, second and third switches. Consequently, the power supply circuit 100 can function as either one voltage regulator or multiple independent voltage regulators. For example, when all six switches are switched off (open), the first, second and third power element components are disconnected and operate independently from each other. In this example, all of the first, second and third regulator controllers 106-1, 106-2, 106-3 are enabled and the power supply circuit functions as three independent voltage regulators. The first power element component converts the first input voltage $V_{in,\,1}$ to the first output voltage $V_{out,\,1}$, the second power element component converts the second input voltage $V_{in,\,2}$ to the second output voltage $V_{out,\,2}$ and the third power element component converts the third input voltage $V_{in,\,3}$ to the third output voltage $V_{out,\,3}$. In another example, when the first, second and third switches are all switch on (closed), the first, second and third power element components are mutually connected and operate cooperatively. In this example, only one of the first, second and third regulator controllers is enabled and the power supply circuit functions as one voltage regulator to convert one input voltage to one output voltage.

In the embodiment depicted in FIG. 1, the fourth, fifth and sixth switches 116-4, 116-5, 116-6 are switched on and off with the first, second and third switches 116-1, 116-2, 116-3. By switching on or off the fourth, fifth and sixth switches, the first, second and third output terminals 108-1, 108-2, 108-3 can be connected together or disconnected from each other. As a result, the power supply circuit 100 can function as either one voltage regulator or multiple independent voltage regulators. For example, when the fourth, fifth and sixth switches are all switched off (open), the first, second and third output terminals are not connected. The power supply circuit can function as three independent voltage regulators and output three output voltages and three output currents through the three output terminals, for example, in three separate output signals. In another example, when the fourth, fifth and sixth switches are all switched on (closed), the first, second and third output terminals are mutually connected. The power supply circuit can function as one voltage regulator and output one output voltage and one output current in an output signal and the output current is the sum of three output currents from the three power element components 114-1, 114-2, 114, through one of the three output terminals.

By switching on and off the first and second set of switches 110, 112, the power supply circuit 100 can be configured as one voltage regulator or multiple independent voltage regulators. In the embodiment depicted in FIG. 1, the switches 116-1, 116-2, 116-3, 116-4, 116-5, 116-6 are controlled by a controller 150. In another embodiment, each of the switches may be controlled by a separate controller. In yet another embodiment, some of the switches may be controlled by a first controller and the rest of the switches may be controlled by a second controller. When all of the switches in the first and second set of switches are switched off (open), the power supply circuit is configured as three independent voltage regulators that output three output voltages and three output currents through the three output terminals 108-1, 108-2, 108-3.

When only one switch in the first set of switches 110 and only one switch in the second set of switches 112 are switched on (closed) and the rest of switches in the first and second set of switches are switched off (open), the power supply circuit 100 can be configured as two independent voltage regulators. For example, when the first and fourth switches 116-1, 116-4 are switched on (closed) and the rest of switches in the first and second set of switches are switched off (open), the first and second power element components 114-1, 114-2 and one of the first and second regulator controllers 106-1, 106-2 function as one voltage regulator. The third power element component 114-3 and the third regulator controller 106-3 function as another independent voltage regulator. In another example, when the second and fifth switches 116-2, 116-5 are switched on (closed) and the rest of switches in the first and second set of switches are switched off (open), the second and third power element components 114-2, 114-3 and one of the second and third regulator controllers 106-2, 106-3 function as one voltage regulator. The first power element component and the first regulator controller function as another independent voltage regulator. In yet another example, when the third and sixth switches 116-3, 116-6 are switched on (closed) and the rest of switches in the first and second set of switches are switched off (open), the first and third power element components and one of the first and third regulator controllers function as one voltage regulator. The second power element component and the second regulator controller function as another independent voltage regulator.

When more than one switches in the first set of switches 110 and more than one switches in the second set of switches 112 are switched on (closed), the power supply circuit 100 can be configured as one voltage regulator. For example, when the first, second, fourth and fifth switches 116-1, 116-2, 116-4, 116-5 are switched on (closed), when the first, third, fourth and sixth switches 116-1, 116-3, 116-4, 116-6 are switched on (closed), when the second, third, fifth and sixth switches 116-2, 116-3, 116-5, 116-6, or when all of the switches in the first and second set of switches are switched on (closed), the power supply circuit is configured as one voltage regulator. In this case, one of the regulator controllers 106-1, 106-2, 106-3 is enabled.

Although the power supply circuit 100 is shown in FIG. 1 as including three power element components 114-1, 114-2, 114-3, more than three regulator controllers 106-1, 106-2, 106-3, more than three first switches 116-1, 116-2, 116-3, and more than three second switches 116-4, 116-5, 116-6, the power supply circuit 100 can include any number of power element components, regulator controllers, and/or first or set switches. In an embodiment, the power supply circuit includes more than three power element components, more than three regulator controllers, more than three first switches, and more than three second switches. The first and second switches can be switched on or off in every combination to configure the power supply circuit as one voltage regulator or N multiple independent voltage regulators, where N can be any number from two to the number of power element components included in the power supply unit.

A conventional power supply circuit usually implements multiple voltage regulators that are completely independent from each other. Each of the voltage regulators includes a power element and a regulator controller. However, because the voltage regulators are completely independent from each other, the conventional power supply circuit may have unnecessary circuit area overhead. The unnecessary circuit area overhead can cause undesired additional costs and decreases product margin. For example, the conventional power supply circuit may include one voltage regulator with high power and high output current capability and multiple voltage regulators with moderate output current capability. When high output power and high output current is needed, the high power voltage regulator is used while the moderate power voltage regulators are not used and kept idle. As a result, the moderate power voltage regulators constitute circuit area overhead. When moderate output currents are needed, all of the voltage regulators in the conventional power supply circuit can be used. However, because of thermal limitations, the size of the high power voltage regulator is chosen for the high output current level. Thus, the high power voltage regulator is oversized for the moderate current level, which results in circuit area overhead. Thus, when the conventional power supply circuit is either used for high power and high output current or for moderate output current, the conventional power supply circuit has overhead in the power element circuit area. Because the circuit area for the power element of a voltage regulator is proportional to the circuit area and cost for implementing the voltage regulator, the wasted circuit area of the power elements in the conventional power supply circuit causes undesired additional costs and decreases product margin.

In the embodiment depicted in FIG. 1, the power supply circuit 100 includes three independent voltage regulators with some shared functionality with respect to the power element components 114-1, 114-2, 114-3. In other embodiments, the power supply circuit may include more or fewer than three independent voltage regulators with some shared functionality. With the shared functionality, the power supply circuit can be configured as one voltage regulator or multiple independent voltage regulators. When the power supply circuit is configured as one voltage regulator, multiple output currents that are generated by the power element components can be combined and output as a final output current. As a result, the power supply circuit in FIG. 1 can use multiple power element components to output high current level. When the power supply circuit is configured as multiple independent voltage regulators, all of the voltage regulators can be used independent from each other. In addition, the circuit area size of each voltage regulator can be designated for moderate output current capability. Thus, the cost of implementing the power supply circuit can be optimized without the decrease of performance, such as load response, line response, Power Supply Rejection Ratio (PSRR), standby current and quiescent current. The load response indicates output voltage variation as a function of load current variation. The line response indicates output voltage variation as a function of input supply voltage variation. The standby current is the current consumption of the power supply circuit while the output voltage is enabled, but current consumption is close to zero. The quiescent current is the current consumption of the power supply circuit while the output voltage is disabled. In other words, sharing the power element components is not risky for the performance of the power supply circuit. However, sharing the regulator controllers 106-1, 106-2, 106-3 and/or the feedback loops 118-1, 118-2, 118-3 may be difficult to realize and may have a negative impact on the performance of the power supply circuit.

In the embodiment depicted in FIG. 1, connections between the first, second and third output terminals 108-1, 108-2, 108-3 are realized by the fourth, fifth and sixth switches 116-4, 116-5, 116-6. However, the connections between the output terminals can be realized by other device (s). In an embodiment, instead of the second set of switches 112 or a single switch, the power supply circuit 100 includes at least one bond wire to selectively connect the power element components 114-1, 114-2, 114-3 to the output terminals 108-1, 108-2, 108-3. The switches are switched open or closed at power-on by the controller 150 while the bond wire can be fixed to be present or not present at the final assembly of the power supply circuit. The bond wire may be used with the first set of switches to configure the power supply circuit to function as either one voltage regulator or multiple independent voltage regulators. Two embodiments of the power supply circuit of FIG. 1 are depicted in FIGS. 2 and 3.

Figure 2:
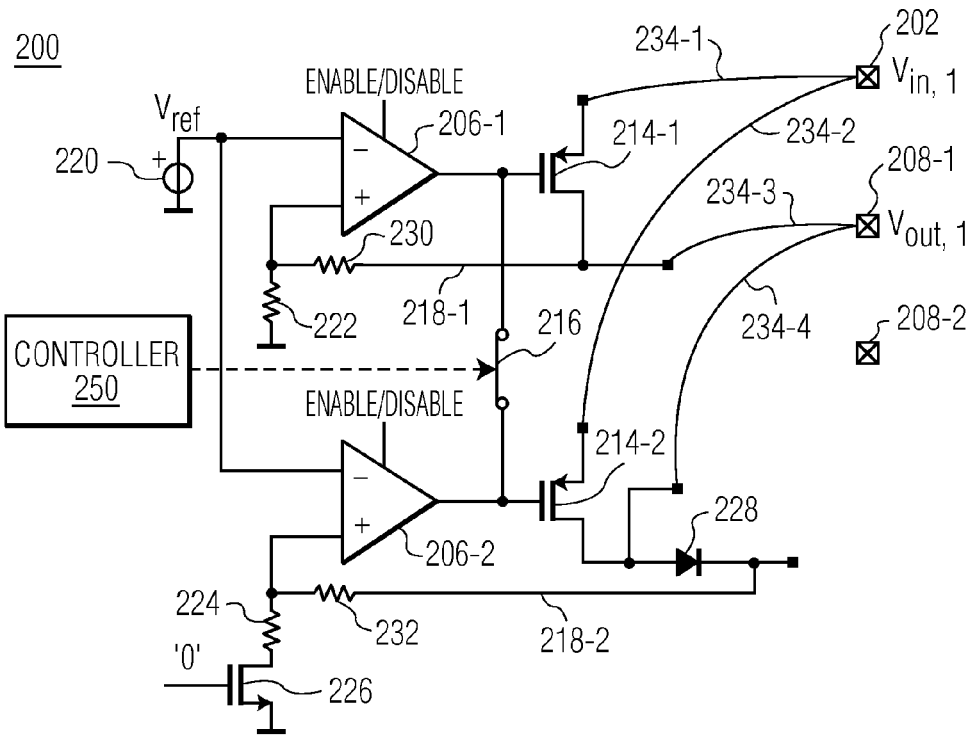
FIG. 2 depicts one embodiment of the power supply circuit of FIG. 1.
Figure 3:
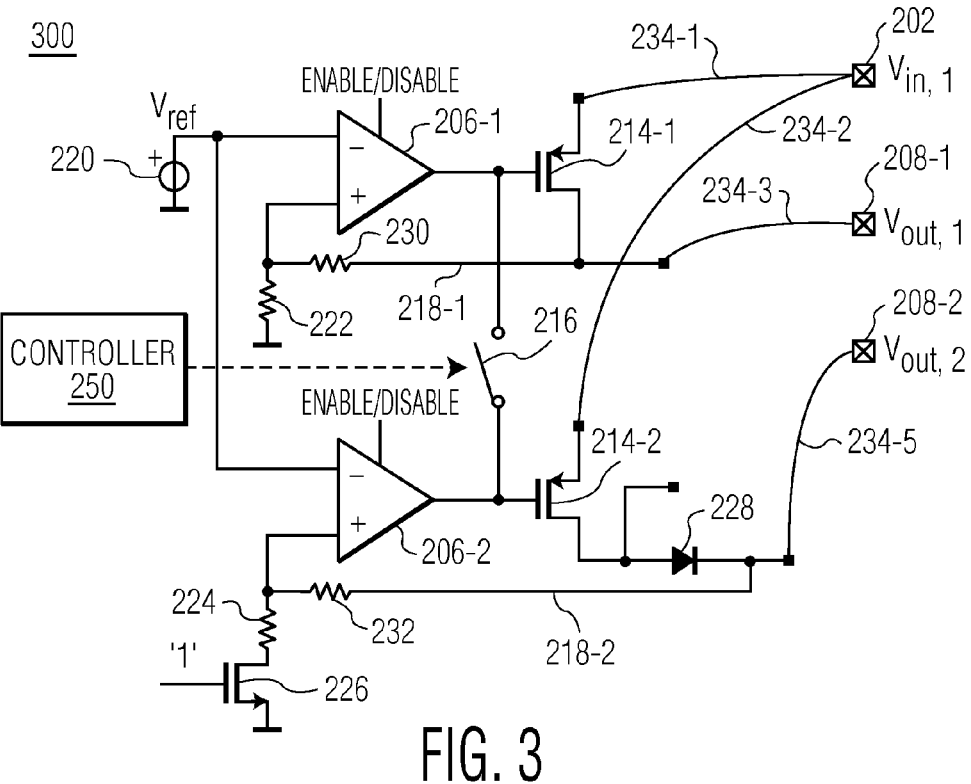
FIG. 3 depicts another embodiment of the power supply circuit of FIG. 1.

FIGS. 2 and 3 depict two embodiments of the power supply circuit 100 of FIG. 1 in which the second set of switches 112 is replaced by bond wires. In the embodiments depicted in FIGS. 2 and 3, a power supply circuit 200 or 300 includes an input terminal 202, a first output terminal 208-1, a second output terminal 208-2, a first OPAMP 206-1, a second OPAMP 206-2, a switch 216 that is controlled by a controller 250, a first transistor 214-1, a second transistor 214-2, a first feedback loop 218-1, a second feedback loop 218-2. The power supply circuit further includes a reference voltage source 220, resistors 222, 224, an optional third transistor 226 and an optional diode 228.

The power supply circuit 200 of FIG. 2 and the power supply circuit 300 of FIG. 2 include same components. However, the power supply circuits in FIGS. 2 and 3 are configured differently by setting the switch 216, "enable/disable" control signals to the OPAMPs 206-1 and 206-2 and bond wires between the transistors 214-1, 214-2 and the output terminals 208-1, 208-2. In the power supply circuit 200 depicted in FIG. 2, the switch 216 is closed and the power supply circuit 200 functions as one voltage regulator to generate an output voltages $V_{out, 1}$ with high output current capability based on an input voltage $V_{in, 1}$.

Only one of the OPAMPs 206-1, 206-2 is activated or enabled by setting the appropriate "enable/disable" control signal to that OPAMP. The other one of the OPAMPs is deactivated or disabled by setting the appropriate "enable/disable" control signal to that OPAMP. Bond wires 234-1 and 234-2 are used to connect the first and second transistors to the input terminal 202. Bond wires 234-3 and 234-4 are used to connect the first and second transistors to the first output terminal 208-1. As a result, the output current of the power supply circuit is the sum of the output currents of the first and second transistors. The second output terminal 208-2 is isolated and not connected to the first and second transistors.

The input terminal 202 of the power supply circuit 200 is used to receive the input voltage $V_{in, 1}$. The first and second transistors 214-1, 214-2 convert the input voltage $V_{in, 1}$ to the output voltage $V_{out, 1}$. The reference voltage source 220 provides a constant reference voltage $V_{ref}$. The first output terminal 208-1 is used to output the output voltage $V_{out, 1}$. The activated OPAMP of the first and second OPAMPs 206-1, 206-2 controls the first and second transistors for the conversion of the input voltage $V_{in, 1}$ to the output voltage $V_{out, 1}$. The first feedback loop 218-1 includes a resistor 230 and the second feedback loop 218-2 includes another resistor 232. The output voltage $V_{out, 1}$ may fluctuate because of the variations of load current at the first and second transistors and the input voltage $V_{in, 1}$. If the output voltage $V_{out, 1}$ becomes too high, the load of the power supply circuit can be damaged. If the output voltage $V_{out, 1}$ becomes too low, the load of the power supply circuit may not function properly. The feedback loops regulate the output voltage $V_{out, 1}$ to a desired output voltage. With the feedback loops, the activated OPAMP can be adjusted to regulate the output voltage $V_{out, 1}$ back to the desired output voltage. Specifically, the resistor 230 and the resistor 222 or the resistor 232 and the resistor 224 determine feedback voltages at the activated OPAMP, which are caused by the output voltage $V_{out, 1}$. The activated OPAMP compares the feedback voltage with the constant reference voltage $V_{ref}$ of the reference voltage source. If there is a difference between the feedback voltages and the reference voltage $V_{ref}$, the activated OPAMP acts as an amplifier to multiply the difference to adjust the first and second transistors, which in turn changes the output voltage $V_{out, 1}$ in the desired direction. The feedback loops provide negative feedbacks. When the output voltage $V_{out, 1}$ is larger than a predefined output voltage, the feedback loops cause the output voltage $V_{out, 1}$ to decrease. When the output voltage $V_{out, 1}$ is smaller than the predefined output voltage, the feedback loops cause the output voltage $V_{out, 1}$ to increase. The optional third transistor 226 can be used to eliminate current flowing between the first output terminal 208-1, the diode 228, and the resistors 224, 232. In the embodiment depicted in FIG. 2, the third transistor is supplied with a logical low signal "0" with a low voltage and is not conducting. The optional diode is not conducting in the power supply circuit of FIG. 2. The reference voltage source, the resistor 222, and the third transistor are connected to the ground.

In the power supply circuit 300 depicted in FIG. 3, the switch 216 is open and the power supply circuit 300 functions as two independent voltage regulators to generate a first and second output voltages $V_{out, 1}$ and $V_{out, 2}$ with moderate output current capability based on an input voltage $V_{in, 1}$. Both OPAMPs 206-1, 206-2 are activated or enabled by setting the appropriate "enable/disable" control signals. Bond wires 234-1 and 234-2 are used to connect the first and second transistors to the input terminal 202. Bond wires 234-3 and 234-5 are used to connect the first and second transistors to the first and second output terminals 208-1, 208-2, respectively.

In the embodiment depicted in FIG. 3, the input terminal 202 of the power supply circuit 300 is used to receive the input voltage $V_{in, 1}$. The first and second transistors 214-1, 214-2 independently convert the input voltage $V_{in, 1}$ to the output voltages $V_{out, 1}$, $V_{out, 2}$. The first output terminal 208-1 is used to output the first output voltage $V_{out, 1}$. The second output terminal 208-2 is used to output the second output voltage $V_{out, 2}$. The first and second OPAMPs 206-1, 206-2 control the first and second transistors, respectively, for the conversion of the input voltage $V_{in, 1}$ to the output voltages $V_{out, 1}$, $V_{out, 2}$. The reference voltage source 220 provides a constant reference voltage $V_{ref}$. Working with the first and second OPAMPs 206-1, 206-2 and the reference voltage source 220, the feedback loops 218-1, 218-2 regulate the output voltages $V_{out, 1}$, $V_{out, 2}$ to desired output voltages. In the embodiment depicted in FIG. 3, the third transistor 226 is supplied with a logical high signal "1" with a high voltage and is conducting. The optional diode allows in an error condition the second output voltage $V_{out, 2}$ to be safely higher than the input voltage $V_{in, 1}$. The diode is optional and may be replaced by a MOS transistor. For use in automotive voltage regulators, the diode may be beneficial. The reference voltage source, the resistor 222, and the third transistor are connected to the ground.

Figure 4:
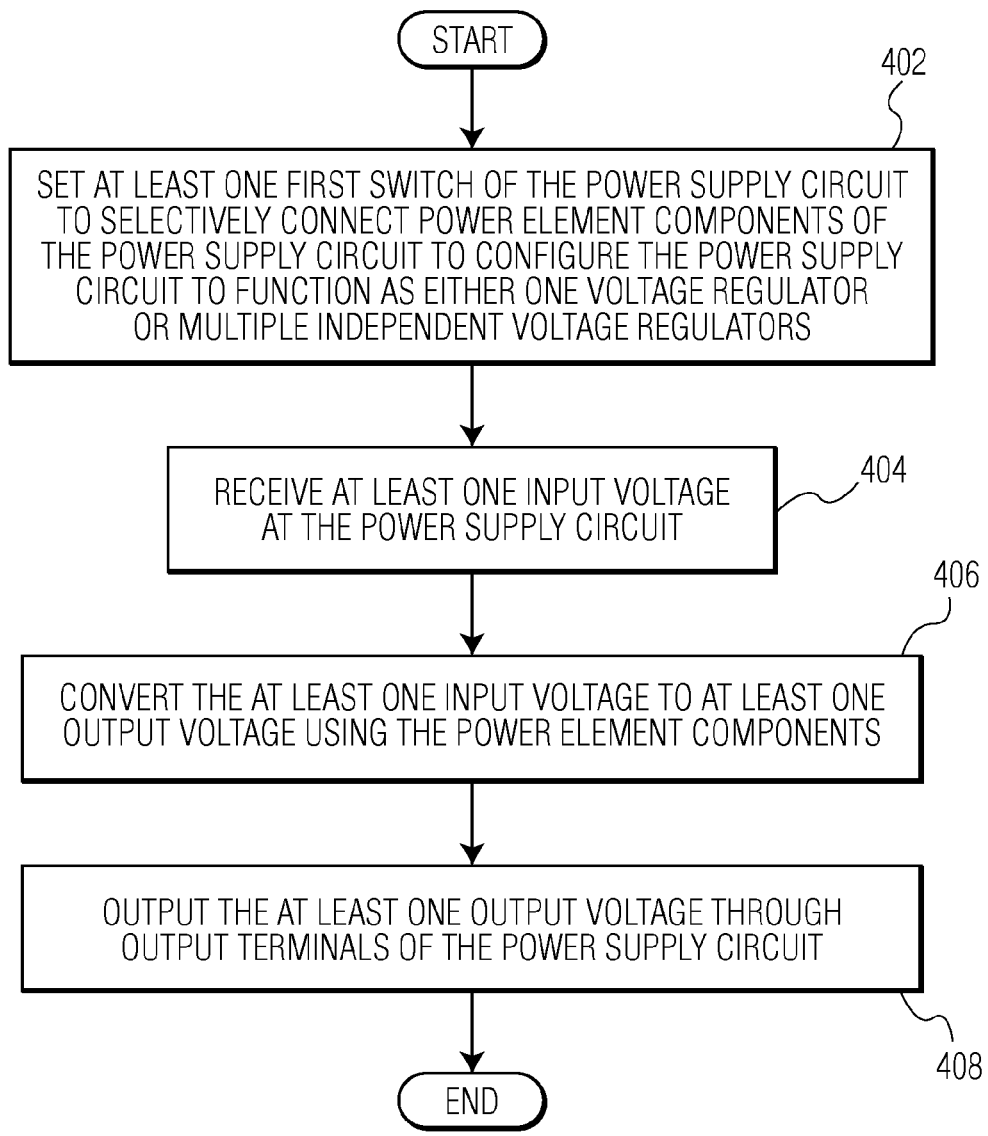
FIG. 4 is a process flow diagram of a method for operating a power supply circuit in accordance with an embodiment of the invention.

FIG. 4 is a process flow diagram of a method for operating a power supply circuit in accordance with an embodiment of the invention. At block 402, at least one first switch of the power supply circuit is set to selectively connect power element components of the power supply circuit to configure the power supply circuit to function as either one voltage regulator or multiple independent voltage regulators. At block 404, at least one input voltage is received at the power supply circuit. At block 406, the at least one input voltage is converted to at least one output voltage using the power element components. At block 408, the at least one output voltage is output through output terminals of the power supply circuit.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A power supply circuit comprising:
   at least one input terminal to receive at least one input voltage;
   a power element comprising a plurality of power element components configured to convert the at least one input voltage to at least one output voltage;
   a plurality of regulator controllers configured to control the power element components for the conversion of the at least one input voltage to the at least one output voltage, wherein each of the regulator controllers is coupled to a different one of the power element components;
   at least one first switch coupled to the regulator controllers and the power element components, wherein the at least one first switch is used to configure the power supply circuit to switch between one voltage regulator and multiple independent voltage regulators, thereby providing multiple independent voltage outputs, one from each of the multiple independent voltage regulators; and
   a plurality of output terminals to output the at least one output voltage.

2. The power supply circuit of claim 1 further comprising at least one second switch coupled to the power element components and the output terminals, wherein the at least one second switch is used with the at least one first switch to selective connect the power element components to the output terminals to configure the power supply circuit to function as either one voltage regulator or multiple independent voltage regulators.

3. The power supply circuit of claim 1 further comprising at least one bond wire connecting the power element components to at least one of the output terminals, wherein the at least one bond wire is used with the at least one first switch to configure the power supply circuit to function as either one voltage regulator or multiple independent voltage regulators.

4. The power supply circuit of claim 1, wherein each of the at least one first switch connects two of the regulator controllers and two corresponding power element components together.

5. The power supply circuit of claim 1, wherein each of the at least one second switch connects one of the output terminals to another one of the output terminals.

6. The power supply circuit of claim 1 further comprising feedback loops connecting the output terminals to the regulator controllers, wherein the feedback loops are used to regulate the at least one output voltage to at least one desired output voltage.

7. The power supply circuit of claim 1, wherein the regulator controllers are further configured to be enabled or disabled by control signals.

8. The power supply circuit of claim 7, wherein all of the regulator controllers are enabled when the power supply circuit is configured to function as multiple independent voltage regulators.

9. The power supply circuit of claim 7, wherein only one of the regulator controllers is enabled when the power supply circuit is configured to function as one voltage regulator.

10. A power supply circuit comprising:
an input terminal to receive an input voltage;
a power element comprising a first transistor and a second transistor, wherein the first and second transistors are configured to convert the input voltage to at least one output voltage;
a first operational amplifier and a second operational amplifier, wherein the first operational amplifier is coupled to the first transistor, the second operational amplifier is coupled to the second transistor, and the first and second operational amplifiers are configured to control the first and second transistors for the conversion of the input voltage to the at least one output voltage;
a first switch coupled to the first and second operational amplifiers and the first and second transistors, wherein the first switch is used to configure the power supply circuit to function as either one voltage regulator or two independent voltage regulators; and
two output terminals to output the at least one output voltage.

11. The power supply circuit of claim 10, wherein the first switch connects the first and second operational amplifiers and the first and second transistors together.

12. The power supply circuit of claim 10 further comprising at least one bond wire connecting the first and second transistors to at least one of the two output terminals, wherein the at least one bond wire is used with the first switch to configure the power supply circuit to function as either one voltage regulator or two independent voltage regulators.

13. The power supply circuit of claim 10 further comprising feedback loops connecting the two output terminals to the first and second operational amplifiers, wherein the feedback loops are used to regulate the at least one output voltage to at least one desired output voltage.

14. The power supply circuit of claim 10, wherein the first and second operational amplifiers are further configured to be enabled or disabled by control signals.

15. The power supply circuit of claim 14, wherein the first and second operational amplifiers are both enabled when the power supply circuit is configured to function as two independent voltage regulators.

16. The power supply circuit of claim 14, wherein only one of the first and second operational amplifiers is enabled when the power supply circuit is configured to function as one voltage regulator.

17. The power supply circuit of claim 10 further comprising a second switch coupled to the first and second transistors and the output terminals, wherein the second switch is used with the first switch to configure the power supply circuit to function as either one voltage regulator or two independent voltage regulators.

18. A method for operating a power supply circuit, the method comprising:
setting at least one first switch of the power supply circuit to selectively connect a plurality of power element components of the power supply circuit to configure the power supply circuit to function as either one voltage regulator or multiple independent voltage regulators;
receiving at least one input voltage at the power supply circuit;
converting the at least one input voltage to at least one output voltage using the power element components; and
outputting the at least one output voltage through a plurality of output terminals of the power supply circuit.

19. The method of claim 18 further comprising:
setting at least one second switch of the power supply circuit with the at least one first switch to selectively connect the power element components and the output terminals of the power supply circuit to configure the power supply circuit to function as either one voltage regulator or multiple independent voltage regulators.

20. The method of claim 18 further comprising:
setting at least one bond wire of the power supply circuit with the at least one first switch to selectively connect the power element components and the output terminals of the power supply circuit to configure the power supply circuit to function as either one voltage regulator or multiple independent voltage regulators.

* * * * *